(12) United States Patent
Drexl et al.

(10) Patent No.: US 10,583,582 B2
(45) Date of Patent: Mar. 10, 2020

(54) INTELLIGENT SURFACE DETECTION AND CORE DRILLING START

(71) Applicant: Hilti Aktiengesellschaft, Schaan (LI)

(72) Inventors: Tobias Drexl, Weil (DE); Andreas Hartig, Augsburg (DE); Thomas Schmalholz, Kaufbeuren (DE); Bernhard Link, Schwabbruck (DE); Goran Golubovic, Buchloe (DE)

(73) Assignee: Hilti Aktiengesellschaft, Schaan (LI)

( * ) Notice: Subject to any disclaimer, the term of this patent is extended or adjusted under 35 U.S.C. 154(b) by 84 days.

(21) Appl. No.: 15/569,588

(22) PCT Filed: Apr. 22, 2016

(86) PCT No.: PCT/EP2016/059014
§ 371 (c)(1),
(2) Date: Oct. 26, 2017

(87) PCT Pub. No.: WO2016/173942
PCT Pub. Date: Nov. 3, 2016

(65) Prior Publication Data
US 2018/0297235 A1 Oct. 18, 2018

(30) Foreign Application Priority Data

Apr. 28, 2015 (EP) .................................. 15165314

(51) Int. Cl.
*E21B 44/02* (2006.01)
*B28D 1/04* (2006.01)
(Continued)

(52) U.S. Cl.
CPC .............. *B28D 1/041* (2013.01); *B23B 49/00* (2013.01); *B23B 51/042* (2013.01); *B28D 7/005* (2013.01);
(Continued)

(58) Field of Classification Search
CPC ..... B23Q 17/2241; E21B 44/00; E21B 44/02; E21B 7/02–7/028; G05B 2219/37405; G05B 2219/45129; Y10T 408/175
See application file for complete search history.

(56) References Cited

U.S. PATENT DOCUMENTS

| | | | | |
|---|---|---|---|---|
| 2,288,545 A | * | 6/1942 | Osgood | E21B 21/01 173/3 |
| 4,537,263 A | * | 8/1985 | Bjor | E21B 7/025 173/1 |

(Continued)

FOREIGN PATENT DOCUMENTS

| | | |
|---|---|---|
| CN | 101863085 | 10/2010 |
| DE | 69009975 | 1/1995 |

(Continued)

OTHER PUBLICATIONS

Search Report of PCT/EP2016/059014, dated Jun. 14, 2016, 2 pages.

*Primary Examiner* — Kipp C Wallace
(74) *Attorney, Agent, or Firm* — Davidson, Davidson & Kappel, LLC

(57) ABSTRACT

A control method for a core drill and a feed device for driving the core drill along a machine holding device, including the method steps: moving the core drill in a first direction; detecting the surface position of a material based on reaching a threshold value for at least one feed device parameter as a first reference value; moving the core drill in a second direction; operating the core drill in a tapping mode; moving the core drill in the first direction; detecting the surface position of a material based on reaching a threshold value for at least one corresponding drilling parameter as a second reference value; activating a water supply; and activating a regulating and control unit for adapting at least one drilling parameter as a function of at (Continued)

least one parameter of the feed device. A feed device for driving a core drill along a machine holding device for the use of the method, a core drill for the use of the method, as well as a core drilling system including a core drill and a feed device for driving the core drill along a machine holding device for the use of the method.

11 Claims, 5 Drawing Sheets

(51) Int. Cl.
   *B28D 7/00* (2006.01)
   *B23B 51/04* (2006.01)
   *B23B 49/00* (2006.01)
(52) U.S. Cl.
   CPC ..... *B23B 2226/75* (2013.01); *B23B 2260/128* (2013.01); *B23B 2270/32* (2013.01); *B23B 2270/54* (2013.01)

(56) References Cited

U.S. PATENT DOCUMENTS

| | | | | |
|---|---|---|---|---|
| 4,831,364 A | * | 5/1989 | Shinohara | G05B 19/4063 340/664 |
| 4,979,575 A | * | 12/1990 | Strom | E21B 7/022 173/1 |
| 5,062,743 A | * | 11/1991 | Wieland | B23Q 11/04 408/11 |
| 5,178,536 A | | 1/1993 | Werly et al. | |
| 5,358,058 A | * | 10/1994 | Edlund | E21B 44/00 175/24 |
| 5,848,859 A | * | 12/1998 | Clark | B23B 39/14 408/1 R |
| 8,257,002 B2 | | 9/2012 | Prust et al. | |

FOREIGN PATENT DOCUMENTS

| | | |
|---|---|---|
| DE | 102007053350 | 5/2009 |
| RU | 1838599 A3 | 8/1993 |
| RU | 1838599 C | 8/1993 |
| SU | 1442974 A1 | 12/1988 |

\* cited by examiner

INTELLIGENT SURFACE DETECTION AND CORE DRILLING START

The present invention relates to a control method for the use of a core drilling system including a core drill and a feed device for driving the core drill along a machine holding device.

Moreover, the present invention relates to a feed device for driving a core drill along a machine holding device for the use of the method according to the present invention.

The present invention also relates to a core drill for the use of the method according to the present invention.

In addition, the present invention relates to a core drilling system including a core drill and a feed device for driving the core drill along a machine holding device for the use of the method according to the present invention.

BACKGROUND

In order to carry out a core drilling operation, a drill bit connected to a core drill is usually positioned on the surface of a mineral material to be worked. For this purpose, a water supply system, which is used for rinsing and cooling the drill bit during the core drilling operation, is switched on and the core drill transfers a torque to the drill bit, whereby the drill bit is set into a rotary motion. With the aid of the transferred torque, the cutting segments (also referred to as teeth) mounted on the lower end of the drill bit cut a hole into the mineral material.

Certain problems may arise at the beginning of the core drilling operation, however, if the drill bit is set down in an uncontrolled manner and too quickly on the surface of the mineral material to be worked. This may result, for example, in a twisting of the entire core drilling system, i.e., the unit made up of the drill bit, the core drill, and the machine holding device. Such a twisting causes unintentional torsional forces to act with increased mechanical loads on the entire core drilling system and, in particular, on the unit made up of the core drill including the drill bit. In addition, the twisting causes the drill bit to be set down onto the surface of the mineral material in an imprecise, i.e., non-planar manner, which may result in inaccuracies in the determination of the drilling depth. The unintentional twisting is further intensified, in particular, by the use of spacers between the machine holding device and the core drill including very large drill bits.

The problem of unintentional twisting is solved in the case of core drills according to the prior art, which include conventional control methods, in that, if the drill bit is set down onto the surface of the mineral material too quickly, the drill bit, along with the core drill, is removed from the surface with the aid of the feed device in order to remove the mechanical load or tension from the core drilling system. As a consequence of once more lifting and suddenly relieving the drill bit and the core drill, however, the core drilling system perceives this as a greatly reduced resistance at the drill bit and, as a result, the feed device reacts with a rapid advance. Consequently, the drill bit impacts the surface of the mineral material at a speed which is too high. As a result, the individual cutting segments, the drill bit, and/or the core drill may become damaged. When the core drilling system detects that the drill bit has been set down onto the surface of the mineral material too rapidly and too hard, the drill bit, along with the core drill, is removed again from the surface with the aid of the feed device. The above-described procedure then starts over again. An unintentional start-up of the control method takes place.

SUMMARY OF THE INVENTION

Moreover, there is a problem associated with core drills according to the prior art, which include conventional control methods, that the water supply system of the core drilling system for rinsing and cooling the drill bit during the core drilling operation is activated inefficiently and much too soon, i.e., before the drill bit actually needs to be rinsed and/or cooled. This often results in an excessive water consumption during the core drilling operation.

It is an object of the present invention to solve the above-described problems and, in particular, to provide a control method for the use of a core drilling system including a core drill and a feed device for driving the core drill along a machine holding device, with the aid of which an unintentional start-up of the control system of the core drilling system at the beginning of the core drilling operation is prevented. Moreover, an alternate or additional object of the present invention is to reduce the water consumption of the water supply system during the core drilling operation.

In addition, an alternate or additional object of the present invention is to provide a feed device for driving a core drill along a machine holding device, a core drill, and a core drilling system including a core drill and a feed device for driving the core drill along a machine holding device for the use of the method.

A control method is therefore provided for the use of a core drilling system including a core drill and a feed device for driving the core drill along a machine holding device.

According to the present invention, the method includes the steps moving the core drill in a first direction;

detecting the position of the surface of a material to be worked based on reaching a predetermined threshold value for at least one corresponding, predetermined parameter of the feed device in the form of a first reference value;

moving the core drill in a second direction;

operating the core drill in a predetermined tapping mode;

moving the core drill in the first direction;

detecting the position of the surface of a material to be worked based on reaching a predetermined threshold value for at least one corresponding, predetermined drilling parameter in the form of a second reference value;

activating a water supply; and activating a control system for adapting at least one predetermined drilling parameter as a function of at least one predetermined parameter of the feed device.

According to one advantageous specific embodiment of the present invention, it may be useful that the drilling parameter corresponds to a rotational speed value of a drive of the core drill, a torque value which the drive generates and transmits to a drilling tool, or an amperage value of the drive.

According to yet another specific embodiment of the present invention, it may be advantageous that the predetermined threshold value corresponds to a predetermined percentage of the corresponding drilling parameter.

Moreover, the above-described object is achieved by providing a feed device for driving a core drill along a machine holding device for the use of the method according to the present invention.

Furthermore, the above-described object is achieved by providing a core drill for the use of the method according to the present invention.

The above-described object is also achieved by providing a core drilling system including a core drill and a feed device for driving the core drill along a machine holding device for the use of the method according to the present invention.

BRIEF DESCRIPTION OF THE DRAWINGS

The present invention is described in greater detail with respect to advantageous exemplary embodiments.

DETAILED DESCRIPTION

Figure 1:
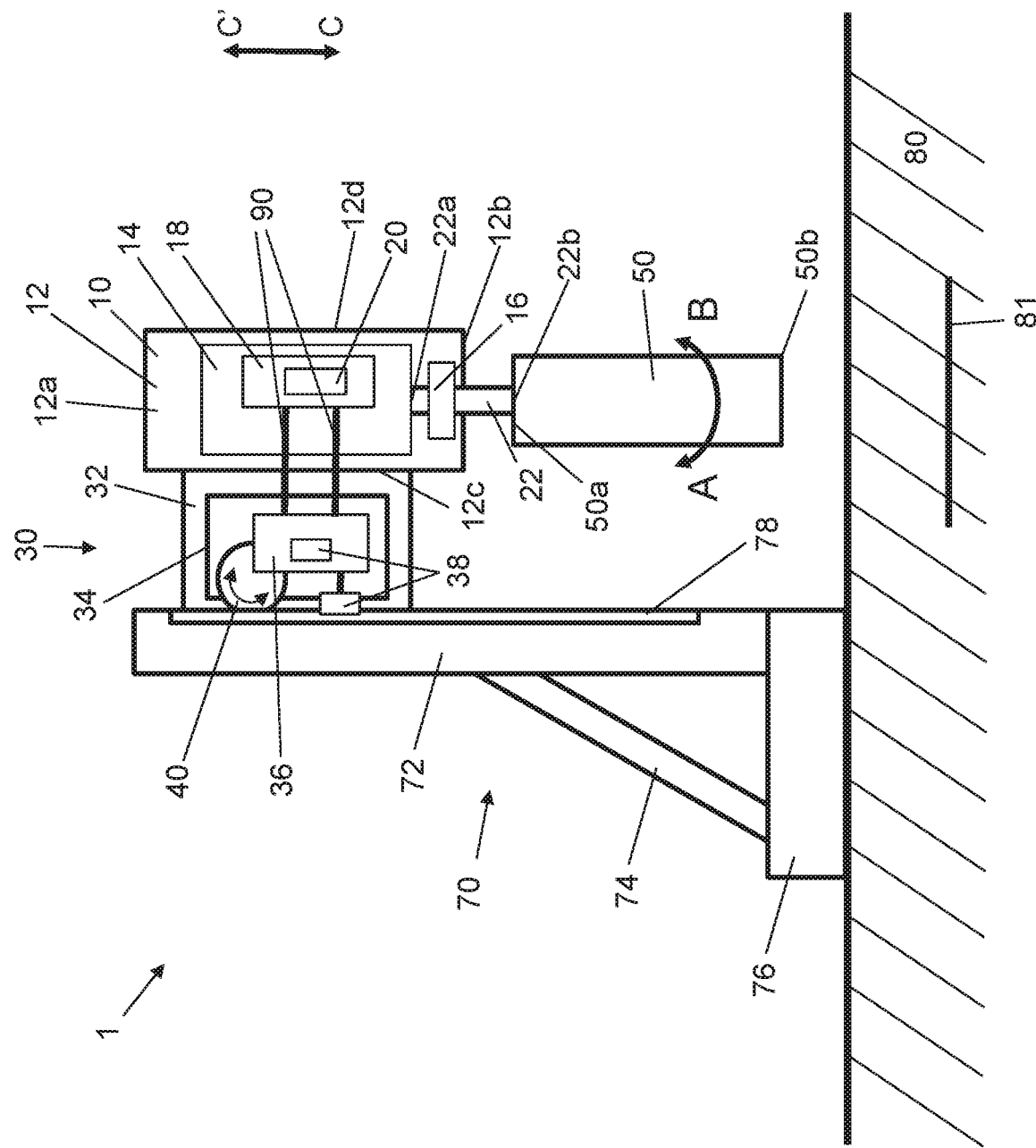
FIG. 1 shows a core drilling system according to the present invention, including a core drill, a feed device, and a machine holding device in a starting position.
Figure 2:
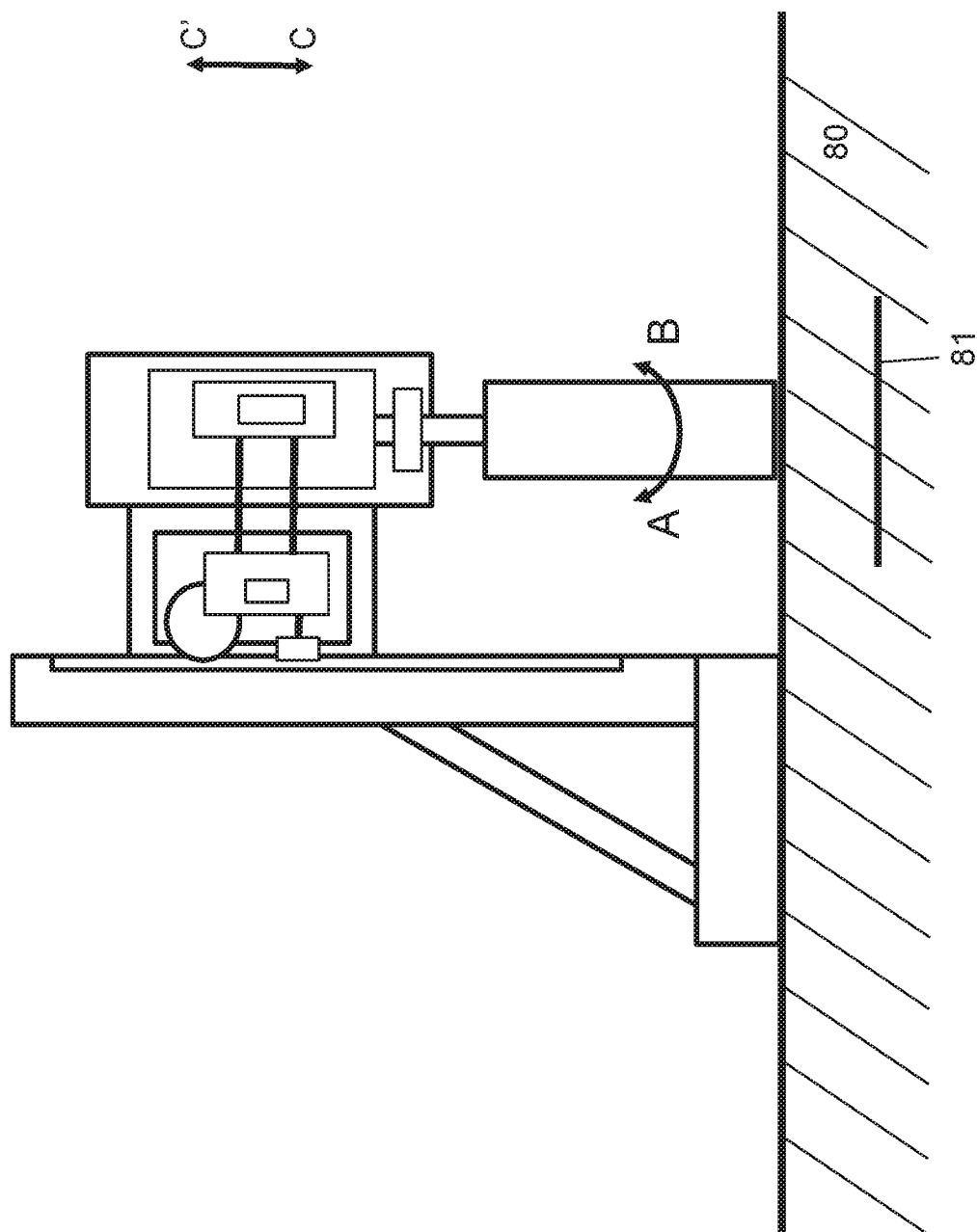
FIG. 2 shows the core drilling system according to the present invention, including the core drill, the feed device, and the machine holding device at the beginning of a core drilling operation in a mineral material.

Device:

FIG. 1 shows a core drilling system 1 as a combination of a core drill 10, a feed device 30, a drilling tool 50 in the form of a drill bit, and a machine holding device in the form of a machine stand 70. Core drilling system 1 also includes a control system for carrying out the control method. Core drilling system 1 also contains a water supply system for rinsing and cooling drill bit 50 during the core drilling operation.

For the purpose of rinsing and cooling drill bit 50, water flows into drill bit 50 at a first end 50a and out of drill bit 50 at a second end 50b with the aid of a rinsing head. The water washes removed pieces of rock and drill slurry out of drill bit 50.

Core drill 10 includes a housing 12, a drive 14, a gearbox 16, a first regulating and control unit 18, sensors 20, and a drive shaft 22. Drive 14 is designed in the form of an electric motor. Alternatively, any other suitable type of drive may also be selected.

According to one special embodiment of the present invention, drive 14 may be formed by a high frequency motor.

First regulating and control unit 18 is designed in such a way that it detects all parameters of core drill 10 and, in particular, all parameters of drive 14, which are measured by sensors 20 of core drill 10. These parameters include, for example, the engaged gear of gearbox 16, the rotational speed of electric motor 14, the torque generated by electric motor 14, the rotational speed of drilling tool 50, the applied and/or output power of electric motor 14, the applied amperage of electric motor 14, etc.

Housing 12 has a top side 12a, a lower side 12b, a left side 12c, and a right side 12d. Drive 14 is situated in the interior of housing 12.

Drive shaft 22 includes a first end 22a and a second end 22b. First end 22a of drive shaft 22 is connected to drive 14 in such a way that drive 14, which is designed as an electric motor, may set drive shaft 22 into a first rotary motion A or a second rotary motion B. Second end 22b of drive shaft 22 protrudes from core drill 10 on lower side 12b of housing 12. Moreover, drilling tool 50, in the form of a cylindrical drill bit, has a first end 50a and a second end 50b. Cutting segments, which make it possible to cut into a mineral material 80, are fastened on second end 50b. The cutting segments are designed as individual cutting teeth in this case. First end 50a of drilling tool 50 is connected to second end 22b of drive shaft 22 in a rotatably fixed manner. Via drive shaft 22, core drill 10 may set drilling tool 50 into first rotary motion A or into second rotary motion B.

Feed device 30 includes a housing 32, in which a feed drive 34, a second regulating and control unit 36, sensors 38, and a drive pinion 40 are positioned. Second regulating and control unit 36 is designed in such a way that it detects all parameters of feed device 30 and, in particular, the parameters of feed drive 34, which are measured by sensors 38 of feed device 30. These measured parameters include, for example, the feed rate of feed device 30 with respect to machine stand 70 or workpiece 80, the distance already covered by feed device 30 since the beginning of the drilling operation as measured from a starting point to be defined (also referred to as zero point), the position of feed device 30 along machine stand 70, the rotation angle of feed drive 34, etc.

In addition, a plurality of parameters may be calculated by regulating and control unit 36 of feed device 30. The parameter calculation takes place in this case with the aid of a comparison between the parameters detected by sensors 38 such as, for example, the rotation angle of drive pinion 40, and the predefined (i.e., preset) parameters. On the basis of the parameter calculation it is possible to ascertain, inter alia, the feed rate of feed device 30 with respect to machine stand 70, the relative and/or absolute position of feed device 30, the distance already covered by feed device 30 since the beginning of the drilling operation, and the point in time and/or the distance until the stop of drilling tool 50 is reached.

As shown in FIG. 1, feed drive 34 is designed in the form of an electric motor in this case, according to a first embodiment.

Under the control of regulating and control unit 36, feed drive 34 drives drive pinion 40 and, therefore, feed device 30 relative to machine stand 70.

Feed device 30 is designed in such a way that it may be mounted on machine stand 70 (as described in the following) and may be moved, with the aid of drive pinion 40, along machine stand 70 in a first direction C. Sensors 38 are designed in the form of angle sensors, rotation angle sensors, acceleration sensors, speed sensors, or position sensors, and are designed in such a way, in this case, that they detect the acceleration, the feed rate, the angle, the rotation angle, and the position of feed device 30 either incrementally directly at feed drive 34 or absolutely along machine stand 70.

Machine stand 70 includes a guide rail 72, a bracing element 74, and a base plate 76. Guide rail 72 is positioned on base plate 76 and is supported by bracing element 74 in such a way that guide rail 72 is oriented vertically or at the predefined angle. Moreover, guide rail 72 includes a toothed bar 78 on one side. Bracing element 74 is optional in this case and, according to an alternative embodiment of the machine stand, may also be dispensed with.

As is also shown in FIG. 1, housing 12 of core drill 10 is fastened on housing 32 of feed device 30.

Feed device 30 is mounted on machine stand 70 in such a way that drive pinion 40 of feed device 30 engages into toothed bar 78 of machine stand 70. When drive pinion 40 is set into a rotary motion under the control of regulating and control unit 36 of feed drive 34, feed device 30 reversibly moves along machine stand 70 in first direction C or in second direction C'. Due to the fact that core drill 10 is fastened on feed device 30, the movement of feed device 30 along machine stand 70 in arrow direction C also causes core drill 10 to move along machine stand 70 in arrow direction C. By way of this vertical movement of core drill 10, drilling tool 50, which is designed in the form of the cylindrical drill bit and is fastened on core drill 10, is moved vertically into workpiece 80 to be worked, i.e., into the substrate, whereby a hole is drilled into workpiece 80. Material 80 is in the form of a mineral material in this case, in particular in the form of concrete including reinforcing bar 81.

Figure 3:
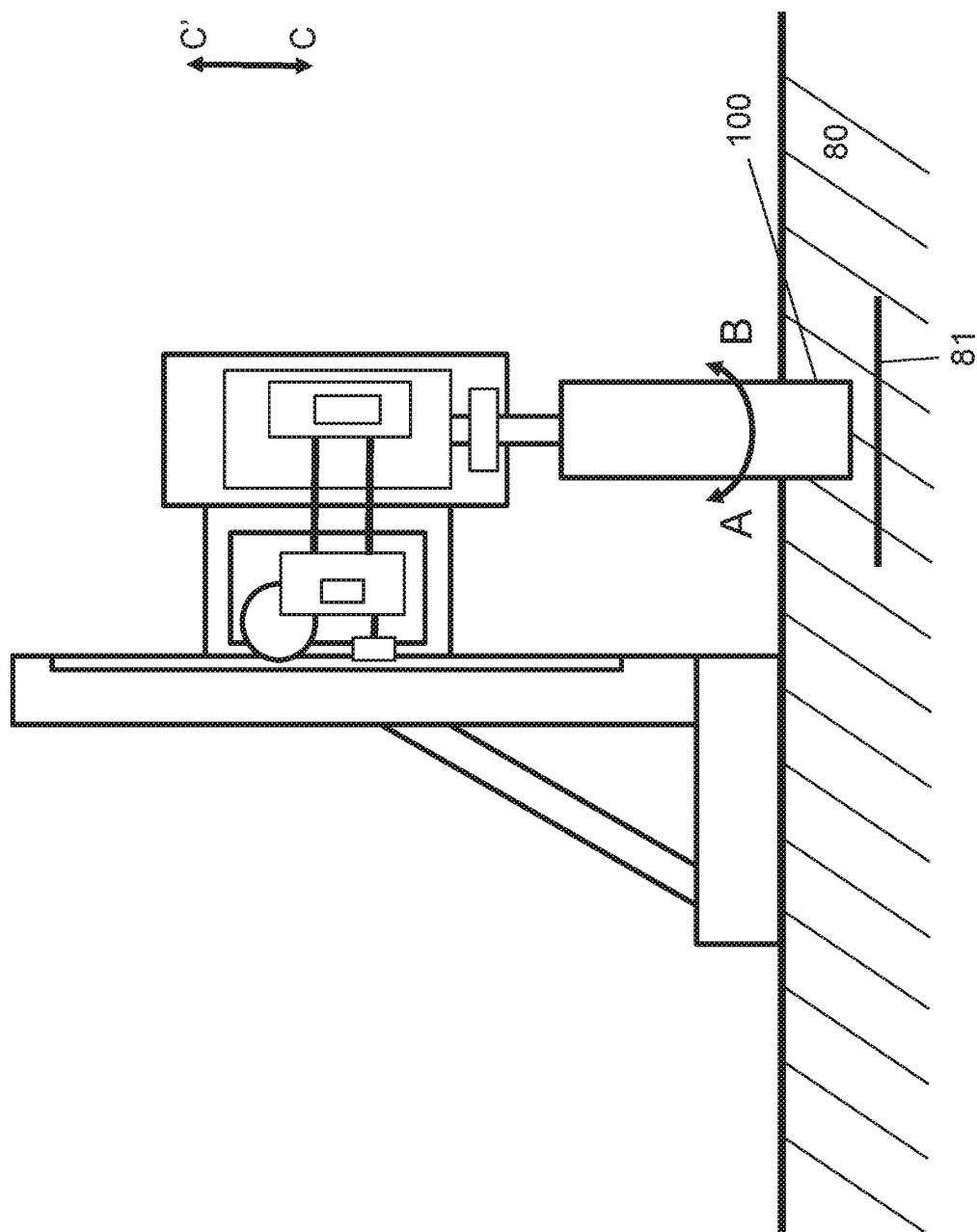
FIG. 3 shows the core drilling system according to the present invention, including the core drill, the feed device, and the machine holding device, with a drill bit in the mineral material.
Figure 4:
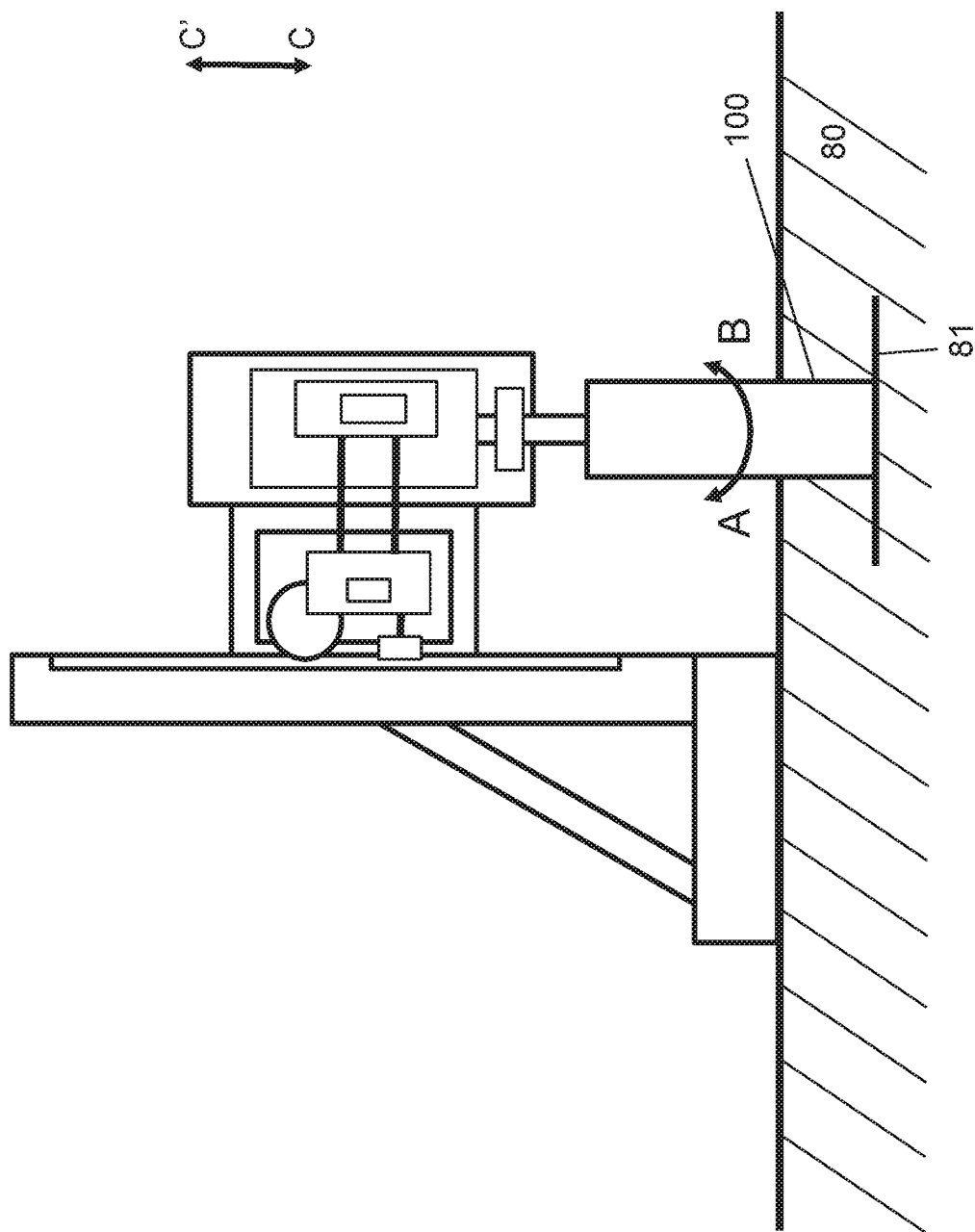
FIG. 4 shows the core drilling system according to the present invention, including the core drill, the feed device, and the machine holding device, with the drill bit during an impact on a reinforcing bar in the mineral material.
Figure 5:
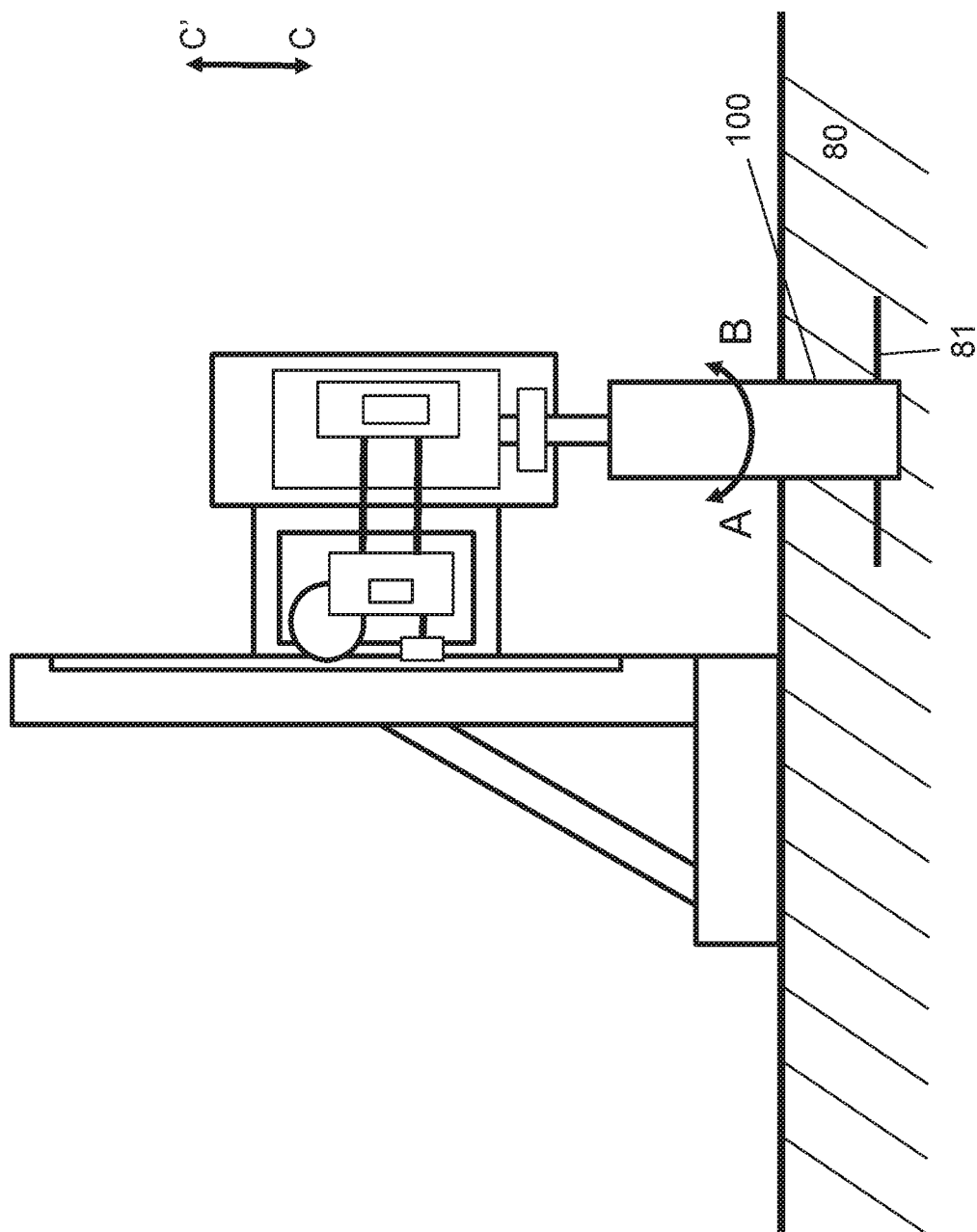
FIG. 5 shows the core drilling system according to the present invention, including the core drill, the feed device, and the machine holding device, with the drill bit after cutting a reinforcing bar in the mineral material.

As described above, particular sensors 38 of feed device 30 measure the parameters of feed device 30. In addition, particular sensors 38 of core drill 10 measure the parameters of core drill 10. As shown in FIG. 3, feed device 30 and core drill 10 are connected to each other with the aid of connecting elements 90 in such a way that all detectable parameters of feed device 30 may be transmitted to core drill 10 and all detectable parameters of core drill 10 may be transmitted to feed device 30. Therefore, there is bidirectional communication between feed device 30 and core drill 10. Due to this bidirectional communication, it is possible, inter alia, that feed device 30 may be started and set into operation with the aid of a start switch (not shown) on core drill 10.

In addition, it is possible, in particular, that the information flow, i.e., the bidirectional transmission of the parameters, between feed device 30 and core drill 10 takes place with the aid of a power cable (not shown). According to one advantageous embodiment, the bidirectional transmission of the parameters may take place from a power cable via core drill 10 to feed device 30.

Drilling Operation:

As described above, a core drilling system 1 is schematically represented in FIGS. 1 through 5 and a core drilling operation for producing a borehole 100 in a mineral material 80 is illustrated with the aid of individual method steps.

In FIG. 1, core drilling system 1 is represented at the beginning of a core drilling operation. For this purpose, drill bit 50 is located above material 80 in second direction C'. Feed device 30 slowly moves core drill 10, along with drill bit 50, in first direction C until second end 50b of drill bit 50 has contact with the surface (O) of mineral material 80 (cf. FIG. 2). In this case, no torque generated by drive 14 is transferred to drill bit 50, so that drill bit 50 is not set into a direction of rotation A or B.

In addition, the water supply system for rinsing and cooling drill bit 50 during the core drilling operation is not yet activated, so that no water emerges from drill bit 50.

When second end 50b of drill bit 50 comes into contact with the surface (O) of mineral material 80, the position of the surface (O) is detected in the form of a first reference value. The first reference value is detected in this case based on the position of feed device 30 relative to machine stand 70.

Core drilling system 1 ascertains the position of the surface (O) of the material to be worked based on reaching a predetermined threshold value for at least one corresponding, predetermined parameter of feed device 30. In other words: core drilling system 1 detects the position of feed device 30 relative to machine stand 70 as the position of the surface (O) when feed device 30 does not achieve a further advance on machine stand 70 for a predetermined time period (i.e., 2 s). The advance of feed device 30 is stopped, in fact, by drill bit 50 impacting hard mineral material 80. Alternatively or in addition thereto, core drilling system 1 may detect an increase in the motor current for feed drive 34 above a predetermined threshold value for a predetermined time period (i.e., 2 s). This increase in motor current is caused by the resistance of drill bit 50 on hard mineral material 80.

The predetermined threshold value may correspond to a predetermined percentage of the corresponding drilling parameter in this case.

Subsequently, drill bit 50 is moved once more from the surface (O) of mineral material 80 in direction C'. Drill bit 50 is lifted away from the surface (O) once more in order to eliminate a possible twisting of core drilling system 1, which may be generated by way of drill bit 50 being set down onto the surface (O) and which may generate a mechanical load or tension in core drilling system 1. Drill bit 50 is moved by feed device 30 approximately 30 mm in second direction C' for this purpose.

Thereafter, core drill 10 is activated and operated in a predetermined tapping mode. In the tapping mode, core drill 10 operates drill bit 50 with a tapping rotational speed. At the tapping rotational speed, drill bit 50 rotates at a relatively slow rotational speed in order to transfer a relatively high torque from drive 14 to drill bit 50. Due to the relatively slow tapping rotational speed and the relatively high torque, the cutting segments (not shown) of drill bit 50 are able to better cut into mineral material 80.

Feed device 30 then moves core drill 10, which is operating in the tapping mode, together with drill bit 50, in direction C and toward the surface (O) of mineral material 80.

When second end 50b of drill bit 50 comes into contact with the surface (O) of mineral material 80, the position of the surface (O) is detected in the form of a second reference value. The second reference value is detected in this case based on the position of feed device 30 relative to machine stand 70. The second reference value for the position of the surface (O) is utilized by core drilling system 1 for checking and, if necessary, correcting the first reference value, and as an actual starting point for measuring the borehole depth. The reference value, which has been checked and, if necessary, corrected, is also used as the starting point for the drilling.

Core drilling system 1 ascertains the position of the surface (O) of the material to be worked based on reaching a predetermined threshold value for at least one corresponding, predetermined drilling parameter. In other words: core drilling system 1 detects the position of feed device 30 relative to machine stand 70 as the position of the surface (O) when the torque generated by drive 14 and transferred to drill bit 50 drops below a predetermined value for a predetermined time period (i.e., 2 s). The torque is reduced due to the fact that drill bit 50 impacts the surface (O) of the mineral material and is slowed down by hard mineral material 80. Alternatively or in addition thereto, core drilling system 1 may detect an increase in the motor current for drive 14 of core drill 10 above a predetermined threshold value for a predetermined time period (i.e., 2 s). This increase in motor current is caused by the resistance of drill bit 50 on hard mineral material 80.

When drill bit 50, which is operating in the tapping mode, now cuts into mineral material 80, the water supply is activated, so that water for rinsing and cooling enters drill bit 50 during the core drilling operation.

Simultaneously thereto or immediately thereafter, regulating and control unit 18, 36 is activated in order to adapt at least one predetermined drilling parameter as a function of at least one predetermined parameter of the feed device.

The drilling parameter may be, in this case, a rotational speed value of drive 14 of core drill 10, a torque generated by drive 14 and transferred to drill bit 50, or an amperage value of drive 14. In addition, the drilling parameter may correspond to a rotational speed value of feed drive 34, the torque generated by feed drive 34, or an amperage value of feed drive 34.

Regulating and control unit 18, 36 controls and regulates the drilling parameters of core drill 10 and of feed device 30 as a function of each other.

The invention claimed is:

1. A control method for the use of a core drilling system including a core drill and a feed device for driving the core drill along a machine holding device, the method comprising:
    moving the core drill in a first direction and positioning a drill bit of the core drill against a surface of the mineral material to be worked while the core drill is not rotating;
    detecting a position of the surface of a mineral material to be worked based on reaching a predetermined threshold value for at least one corresponding, predetermined parameter of the feed device in the form of a first reference value;
    after the moving the core drill in a first direction and detecting a position of the surface, moving the core drill in a second direction; and then operating the core drill in a predetermined tapping mode wherein the core drill is rotated with slow speed and high torque; and then moving the core drill in the first direction for a second time;
    after the core drill moves in the first direction for the second time, detecting the position of the surface of the mineral material to be worked based on reaching a drilling parameter predetermined threshold value for at least one corresponding, predetermined drilling parameter in the form of a second reference value; activating a water supply; and activating a regulating and control unit for adapting the at least one predetermined drilling parameter as a function of the at least one predetermined parameter of the feed device.

2. The method as recited in claim 1 wherein the drilling parameter corresponds to a rotational speed value of a drive of the core drill, a torque value generated by the drive and transmitted to a drilling tool, or an amperage value of the drive.

3. The method as recited in claim 1 wherein the predetermined drilling parameter threshold value corresponds to a predetermined percentage of the corresponding drilling parameter.

4. The control method as recited in claim 1 wherein no torque is transmitted to the drill bit in the positioning step.

5. The control method as recited in claim 1 wherein the first reference value is determined based on a position of the feed device relative to a machine stand.

6. The control method as recited in claim 1 wherein the predetermined threshold value is reached when a position of the feed device relative to a machine stand does not achieve a further advance for a predetermined time period.

7. The control method as recited in claim 1 wherein the predetermined threshold value is a motor current for a feed drive of the feed device.

8. The control method as recited in claim 1 wherein the moving in the second direction occurs before the predetermined tapping mode, the predetermined tapping mode including drilling the mineral material.

9. A feed device for driving a core drill along a machine holding device for performing a control method comprising:
    moving the core drill in a first direction and positioning a drill bit of the core drill against a surface of the mineral material to be worked while the core drill is not rotating;
    detecting a position of the surface of a mineral material to be worked based on reaching a predetermined threshold value for at least one corresponding, predetermined parameter of the feed device in the form of a first reference value;
    after the moving the core drill in a first direction and detecting a position of the surface, moving the core drill in a second direction; and then operating the core drill in a predetermined tapping mode wherein the core drill is rotated with slow speed and high torque; and then moving the core drill in the first direction for a second time;
    after the core drill moves in the first direction for the second time, detecting the position of the surface of the mineral material to be worked based on reaching a drilling parameter predetermined threshold value for at least one corresponding, predetermined drilling parameter in the form of a second reference value; activating a water supply; and activating a regulating and control unit for adapting the at least one predetermined drilling parameter as a function of the at least one predetermined parameter of the feed device.

10. A core drill for performing a control method comprising:
    moving the core drill in a first direction and positioning a drill bit of the core drill against a surface of the mineral material to be worked while the core drill is not rotating;
    detecting a position of the surface of a mineral material to be worked based on reaching a predetermined threshold value for at least one corresponding, predetermined parameter of the feed device in the form of a first reference value;
    after the moving the core drill in a first direction and detecting a position of the surface, moving the core drill in a second direction; and then operating the core drill in a predetermined tapping mode wherein the core drill is rotated with slow speed and high torque; and then moving the core drill in the first direction for a second time;
    after the core drill moves in the first direction for the second time, detecting the position of the surface of the mineral material to be worked based on reaching a drilling parameter predetermined threshold value for at least one corresponding, predetermined drilling parameter in the form of a second reference value; activating a water supply; and activating a regulating and control unit for adapting the at least one predetermined drilling parameter as a function of the at least one predetermined parameter of the feed device.

11. A core drilling system comprising a core drill and a feed device for driving a core drill along a machine holding device for performing a control method comprising:

moving the core drill in a first direction and positioning a drill bit of the core drill against a surface of the mineral material to be worked while the core drill is not rotating;

detecting a position of the surface of a mineral material to be worked based on reaching a predetermined threshold value for at least one corresponding, predetermined parameter of the feed device in the form of a first reference value;

after the moving the core drill in a first direction and detecting a position of the surface, moving the core drill in a second direction; and then operating the core drill in a predetermined tapping mode wherein the core drill is rotated with slow speed and high torque; and then moving the core drill in the first direction for a second time;

after the core drill moves in the first direction for the second time, detecting the position of the surface of the mineral material to be worked based on reaching a drilling parameter predetermined threshold value for at least one corresponding, predetermined drilling parameter in the form of a second reference value; activating a water supply; and activating a regulating and control unit for adapting the at least one predetermined drilling parameter as a function of the at least one predetermined parameter of the feed device.

* * * * *